Sept. 13, 1966 W. H. EMERSON 3,273,150

ANECHOIC CHAMBER

Filed March 26, 1964 2 Sheets-Sheet 1

Inventor
WILLIAM H. EMERSON
By James P. Lindsay
Attorney

Sept. 13, 1966 W. H. EMERSON 3,273,150

ANECHOIC CHAMBER

Filed March 26, 1964 2 Sheets-Sheet 2

Inventor
WILLIAM H. EMERSON
By James P. Lindsay
Attorney

United States Patent Office 3,273,150
Patented Sept. 13, 1966

3,273,150

ANECHOIC CHAMBER

William H. Emerson, Huntington, Conn., assignor to The B. F. Goodrich Company, New York, N.Y., a corporation of New York Filed Mar. 26, 1964, Ser. No. 355,118
3 Claims. (Cl. 343—18)

Figure 1:
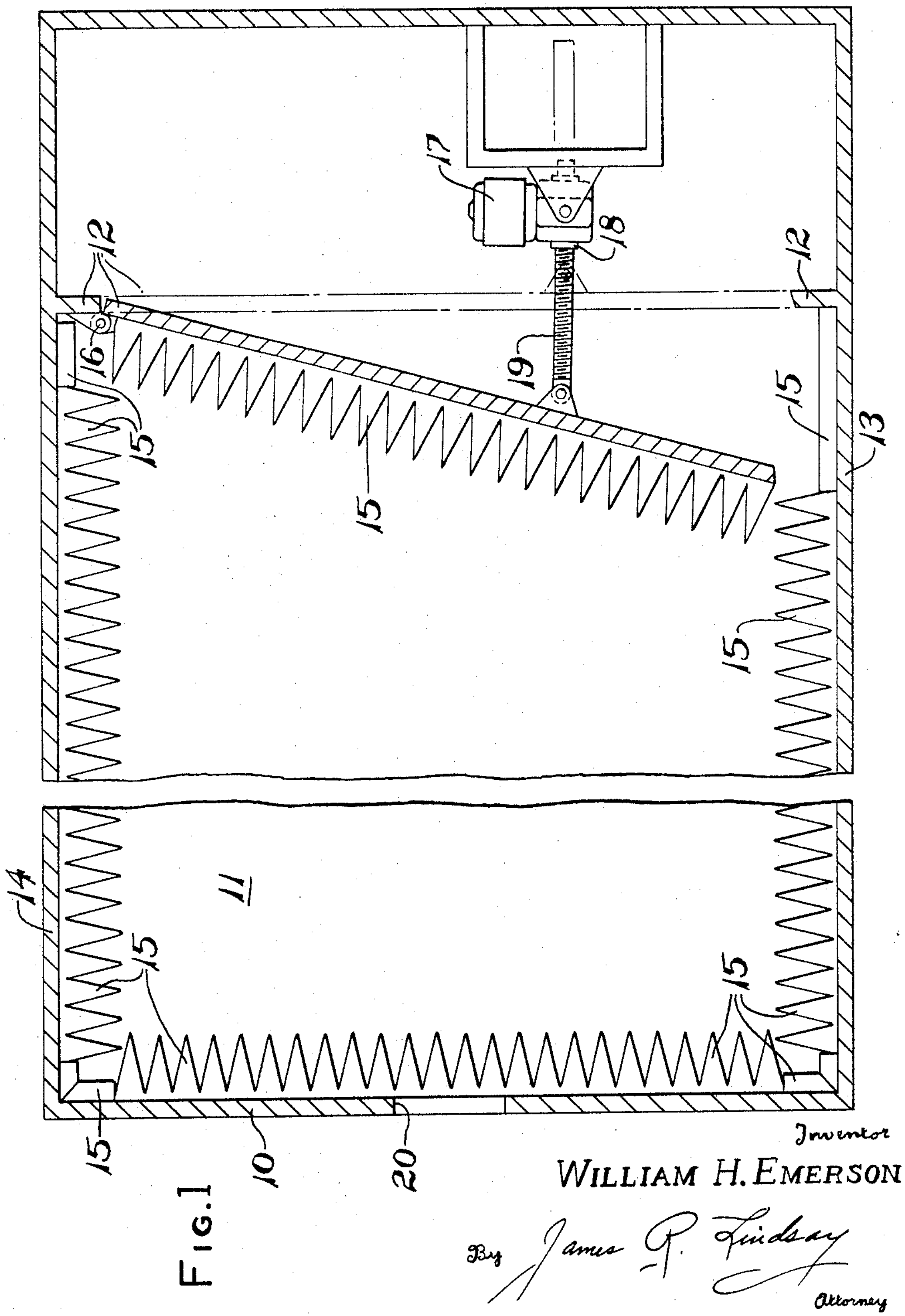

This invention relates to an anechoic chamber suitable for evaluating and measuring the characteristics of antennas and other electronic devices which ideally are studied in an environment which resembles that of outer space.

To study the characteristics and to evaluate the performance of certain electronic devices, it is desirable that the evaluations and studies be carried out in an environment in which there are no interfering energy disturbances that would introduce inaccuracies in the test data. Such an environment is found in outer space, but it is not possible to conduct the testing of such devices in actual outer space. As an alternative, test chambers have been constructed within which it is attempted to achieve an echo-free environment such as is encountered in outer space to permit the devices to be evaluated with at least some degree of accuracy. Various test chamber constructions have been proposed for use in carrying out the study and evaluation of the electronic devices, the various constructions meeting with varying degrees of success in approaching an essentially echo-free environment. Common to all of the constructions proposed has been the use of microwave energy absorber material as a lining for the test chamber, the lining being intended to absorb microwave energy propagated against the walls, ceiling and floor of the chamber and thereby eliminate its being reflected back into the interior of the chamber.

In general, two principal types of microwave energy absorbing materials are used for such purposes. These are (1) the narrow band absorbers and (2) the broad band absorbers. The narrow band absorbers usually are relatively thin sheets of low dielectric material which are effective only over a rather limited frequency range. The broad band absorbing materials, on the other hand, generally are considerably thicker than the narrow band materials, usually having a thickness of at least ¼ of the length of the longest wave length to which the absorbing material is intended to be exposed, and are effective over a much greater frequency range as their name would imply.

Broad band absorbing materials may be further separated into two distinct classes of absorbing materials depending upon the manner by which the microwave energy impinged against the absorber material is absorbed. One such class of broad band absorbing material is like the narrow band absorber in that it is a flat panel or sheet-like material. However, it differs from the narrow band absorbing material in that it consists of several layers of low dielectric constant material which have dispersed therein a material capable of absorbing microwave energy. The amount of energy absorbing material that is dispersed in each successive layer of the structure is greater as the layers progress from the front to the rear of the panel so that the microwave energy is directed first into the layer with the least energy absorbing material therein and then successively into layers with ever increasing amounts of the energy absorbing material therein.

The second class of broad band absorbing material may be considered to be comprised of pyramidal or cone-shaped elements formed of a low density material that exhibits low dielectric properties and which is coated or impregnated with a substance that inherently absorbs microwave energy. It will be appreciated that, as the depends upon the geometrical configuration of the absorber structure for ensuring acceptable absorption of the microwave energy. It will be appreciated that, as the microwave energy impinges against the tapered surfaces of the pyramidal or conical shapes of the absorber panel, part of the energy penetrates into the absorber panel while a portion of the energy is reflected (or is reemitted, as it is sometimes said), the reflected energy waves being reflected at an angle the same as the angle which the impinging waves made with the surface against which the energy is being directed. Because of the configuration of the absorbing material, essentially the entire reflected energy is reflected in a direction toward an absorbing surface of the panel rather than being reflected back into the interior of the chamber, as is explained in U.S. Patent 2,822,539 and U.S. Patent 2,870,439. Further discussion concerning this type of energy absorbing material is found in U.S. Patent 2,464,006 and U.S. Patent 2,977,591.

The device to be studied or evaluated in the chamber is placed at one end of the chamber facing a position at the opposite end of the chamber from which a microwave energy signal can be beamed toward the device under observation. In principle, microwave energy which "strays" from the beam being directed toward the device under investigation and which impinges against a side wall of the chamber or the floor or ceiling of the chamber is absorbed by the microwave absorber material lining the side walls of the chamber and disposed over the floor and ceiling of the chamber so that this energy is not reflected or reemitted back into the interior of the chamber to interfere with the signal being beamed at the device being evaluated. Also, microwave energy that is impinged against the back wall of the anechoic chamber must be absorbed by the microwave absorbing material lining the back wall of the chamber or the energy waves reflected back toward the front wall of the chamber will interfere with the beam of energy being directed toward the device under study and will introduce inaccuracies in the test result data. Ideally, all microwave energy which encounters absorbing material is absorbed by the material on its initial encounter with the absorbing material so that there is no wave energy reflected or remitted into the interior of the chamber, for it is only when this condition exists that an environment equivalent to that of outer space is created. Unfortunately, the microwave absorbing materials known today are not completely effective and some interference resulting from the reflected or reemitted energy is experienced.

The present invention provides an anechoic chamber which permits a reduction in the amount of microwave energy that is reflected or reemitted from the back wall of the chamber toward the electronic component under investigation as compared to the immovable vertical back wall heretofore employed in chambers of this type. In accordance with this invention, the back wall of the anechoic chamber is provided with means which will permit the wall to be tilted to a selected position at which the reflection or reemission of wave energy toward the component being evaluated is at a minimum for the frequency of energy being employed in the test.

It has been found that the reflective characteristics of the back wall of an anechoic chamber varies with different frequencies of microwave energy impinged against the wall and further that as the wall is tilted the ability of the wall to absorb microwave energy varies. The variance in the effectiveness of the wall for absorbing microwave energy is not merely a progressive change but apparently is based upon a complex relationship of variables that produces a very erratic change as the wall is tilted going through an unsymmetrical series of changes from a more efficient to a less efficient and then a more efficient position at different angles of tilt as compared to the same wall when in a vertical position. The most efficient position of the back wall for carrying out a test at a given frequency would be at an angle of tilt at which the amount of microwave energy reflected or reemitted back toward the electronic device being studied is at a minimum so that as little interference with the signal beam as possible results from energy reflected from the back wall of the chamber. It is because of this finding that the anechoic chamber constructed in accordance with this invention is provided with a back wall that can be tilted to take advantage of the greater effectiveness of the back wall for absorbing microwave energy when it is in an optimum tilted position.

Figure 2A:
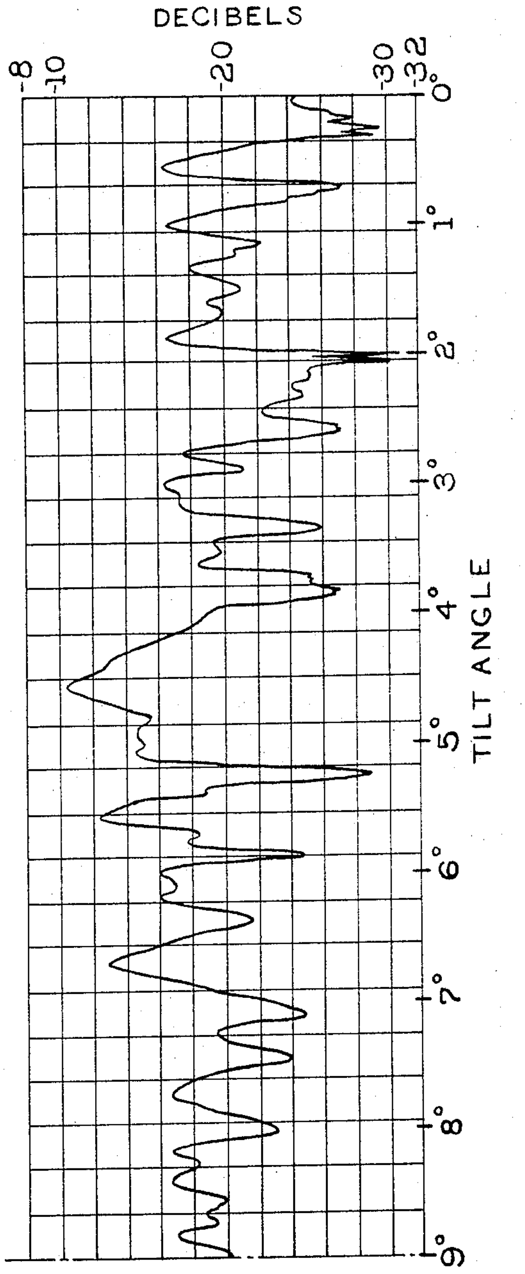
Figure 2B:
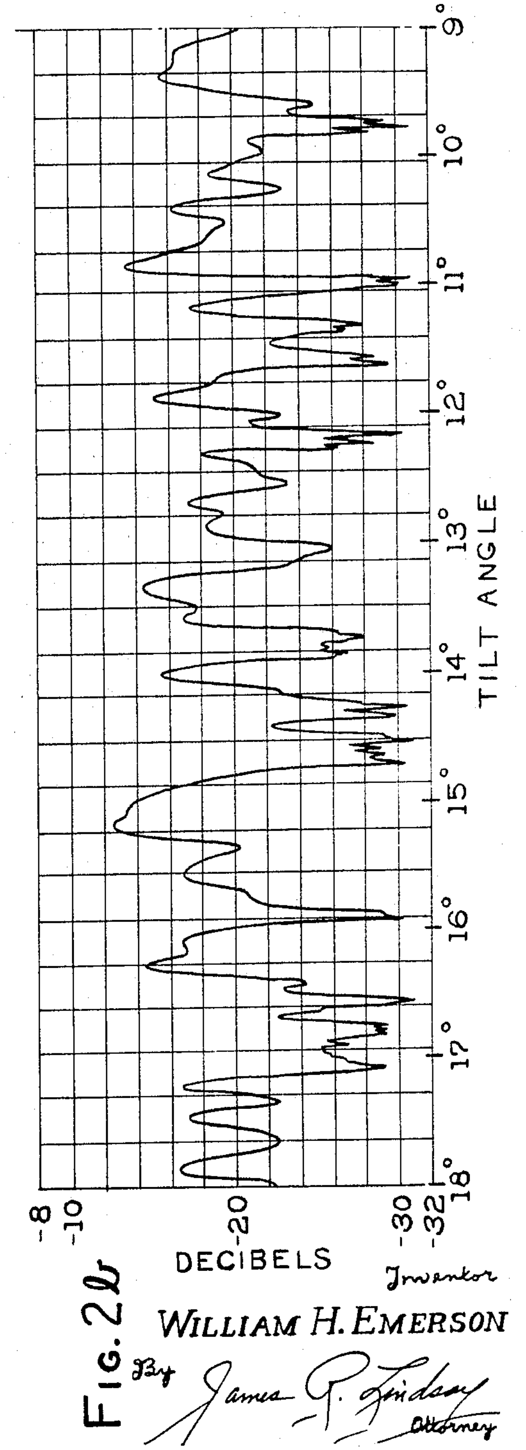

The invention will be more clearly understood from the following description of a specific embodiment of this invention and from the drawings in which:

FIG. 1 is a side elevation in section of an anechoic chamber embodying this invention; and FIGS. 2*a* and 2*b* together form a graph showing the variance in reflected microwave energy toward a reference point with variance in the tilt angle of the back wall of the anechoic chamber shown in FIG. 1 when a beam of microwave energy of selected frequency is directed against the back wall of the chamber.

Referring to the embodiment of the invention shown in the drawings, the anechoic chamber is a rectangular-shaped room defined by a front wall 10, side walls 11 (only one side wall being shown), back wall 12, floor 13 and ceiling 14. The walls, floor and ceiling of the chamber are formed of any conventional structural material, the specific structural material selected for use in the chamber walls, floor and ceiling not being a part of the present invention. The interior surfaces of the front, back and side walls 10, 11 and 12 and of the floor 13 and ceiling 14 are lined with microwave energy absorbing material 15 which is intended to absorb any microwave energy which impinges against it. The particular lining material 15 chosen to line the walls, ceiling and floor of the anechoic chamber will vary depending upon the requirements of the chamber. Usually, broad band absorbing materials are employed for lining the chamber so that the chamber can be utilized for evaluating devices over a greater frequency range thereby providing the chamber with greater versatility. A flat panel-type broad band absorbing material normally is used to form pathways on which one can walk in the interior of the chamber and in areas where the protruding pyramids or cones of the geometrical-type broad band absorbing material would be impractical or unsuitable because of space limitations. However, since the geometrical-type broad band absorbing material is most effective, it normally is used to line the chamber interior wherever possible and practical.

As is clearly shown in FIG. 1, the back wall 12 of the chamber is hinged at 16 to permit the back wall 12 of the chamber to be tilted about a horizontal axis from its vertical position (shown in dot and dash lines) to a tilted position at which the back wall is most effective in absorbing microwave energy directed against it. The chamber can be designed so that the entire back wall of the chamber is capable of being tilted or can be constructed so that essentially the entire back wall is capable of being tilted leaving a peripheral border of up to about one to two feet in width at all times in the vertical position so that the tilting of the back wall will not prevent the use of the pyramidal or conical shaped elements of suitable height for lining the areas of the side walls, floor and ceiling of the chamber immediately adjacent to the back wall of the chamber. When reference is made in this specification that the back wall of the chamber is tiltable, it is intended to include both said constructions mentioned above.

The back wall 12 of the chamber may be tilted by any suitable means. In the embodiment shown, a reversible motor 17 turns a threaded collar 18 which then turned in one direction moves a threaded shaft 19 that is pivotally mounted to back wall 12 toward the front wall of the chamber thereby causing the back wall 12 to pivot about the horizontal axis of the hinged attachment at 16 and to be swung in the direction of the front wall of the chamber and which when turned in the opposite direction moves the shaft 19 rearwardly causing the back wall 12 to be swung back toward its vertical position. It will be understood that other means and arrangements for tilting the back wall 12 form a vertical position either forward toward and/or backward from the front wall 10 of the chamber can be employed. For example, the back wall 12 can be hinged midway up its height and can be pivoted about the horizontal axis at the hinge by a hand crank which operates a rack and pinion assembly connected between the hand crank and the back wall 12.

The arc through which the back wall 12 should be capable of being tilted can vary. Normally, provision for tilting the back wall beyond 25° from the vertical position is of no benefit, since optimum effectiveness of the back wall will be realized upon tilting the back wall less than 25° from the vertical position.

The position or positions of tilt at which the back wall exhibits optimum or near optimum effectiveness for absorbing microwave energy will vary with the frequency of the energy being impinged against the wall. For most frequencies, there will be several positions of tilt at which the back wall will exhibit optimum or near optimum conditions as is illustrated by the graph of FIG. 2. The graph illustrates the effect of tilting the back wall of an actual rectangular-shaped anechoic chamber (measuring 20 feet wide, 50 feet long and 20 feet high) when a signal having a frequency of 10 gigacycles (gc.) per second is directed against the back wall, the signal being beamed along a path which is normal to the back wall when the back wall is in a vertical position. The reflected energy is measured and is plotted as a reduction in the energy reflected from a flat square steel plate one meter on a side when an energy beam of the same frequency as that being evaluated is impinged against the steel plate. From the graph of FIG. 2, it will be observed that appreciably improved absorption of the microwave energy is realized when the back wall is tilted at about 2.0°, at about 9.8°, at about 14.5° and at about 16.6° as compared to the effectiveness of the back wall when it is in a vertical position. The graph indicates that the efficiency of the chamber will be materially improved by tilting the back wall to one of the said angle positions when evaluating a device at a frequency of 10 gigacycles per second. A separate graph is prepared for each frequency at which the device is to be tested to determine the optimum angle (or angles) of tilt of the back wall of the chamber for the various frequencies to be used.

In utilizing the anechoic chamber, the device to be evaluated or studied is mounted, usually on a pedestal, centrally between the side walls of the chamber and toward the back wall of the chamber and is positioned to receive a microwave energy signal that is beamed in its direction from a signal-emitting device located either in the front part of the chamber or located exteriorly of the chamber but positioned to direct the signal through a port or window 20 positioned in the front wall of the chamber.

While reference hereinabove has been made to tilting the back wall of the chamber about a horizontal axis, it will be appreciated that the same benefit in chamber efficiency can be realized if the back wall is mounted to be pivoted about a vertical axis in which case the back wall would be turned to the side instead of being tilted forward or backward.

I claim:

1. An anechoic chamber for providing an environment simulating that of outer space in which electronic devices can be evaluated and studied, the interior wall surfaces of said chamber being lined with microwave energy absorbing material for absorbing microwave energy impinged thereagainst, said chamber comprising a back wall toward which microwave energy is directed during the evaluation and study of electronic devices in said chamber, said back wall being provided with means for varying the angle which said back wall presents to the direction from which the microwave energy is emitted in order to vary the angle at which the microwave energy absorbing material disposed on the interior surface of said back wall presents itself to microwave energy directed toward said back wall of the chamber.

2. An anechoic chamber for providing an environment simulating that of outer space in which electronic devices can be evaluated and studied, the interior wall surfaces of said chamber being lined with microwave energy absorbing material for absorbing microwave energy impinged thereagainst, said chamber comprising a back wall toward which microwave energy is directed during the evaluation and study of electronic devices in said chamber, said back wall being provided with means for pivoting said back wall about a horizontal axis to vary the angle which the microwave energy absorbing material disposed on the interior surface of said back wall presents itself to microwave energy directed toward said back wall of the chamber.

3. An anechoic chamber for providing an environment simulating that of outer space in which electronic devices can be evaluated and studied, the interior wall surfaces of said chamber being lined with microwave energy absorbing material for absorbing microwave energy impinged thereagainst, said chamber comprising a back wall toward which microwave energy is directed during the evaluation and study of electronic devices in said chamber, said back wall being provided with means for pivoting said back wall from a vertical position about a horizontal axis through an arc up to 25 degrees to vary the angle which the microwave energy absorbing material disposed on the interior surface of said back wall presents itself to microwave energy directed toward said back wall of the chamber.

References Cited by the Examiner

UNITED STATES PATENTS

| | | | |
|---|---|---|---|
| 1,675,102 | 6/1928 | Holland | 188—33 X |
| 2,822,539 | 2/1958 | McMillan | 343—18 |
| 2,977,591 | 3/1961 | Tanner | 343—18 |

OTHER REFERENCES

Kolar, R. F., Design and Build an Anechoic Chamber, in Electronic Industries, 18(4) pp. 72–76. April 1959.

CHESTER L. JUSTUS, *Primary Examiner.*

G. M. FISHER, *Assistant Examiner.*

UNITED STATES PATENT OFFICE
CERTIFICATE OF CORRECTION

Patent No. 3,273,150 September 13, 1966

William H. Emerson

It is hereby certified that error appears in the above numbered patent requiring correction and that the said Letters Patent should read as corrected below.

Column 1, line 70, strike out "It will be appreciated that, as the", and insert instead -- This class of broad band absorbers --; column 3, line 75, for "then" read -- when --; column 4, line 9, for "form" read -- from --.

Signed and sealed this 1st day of August 1967.

(SEAL)
Attest:

EDWARD M. FLETCHER, JR.
Attesting Officer

EDWARD J. BRENNER
Commissioner of Patents